Sept. 9, 1941.                    N. B. NEWTON                    2,255,181
                        SUSPENSION SYSTEM FOR VEHICLES
                            Filed Sept. 30, 1940
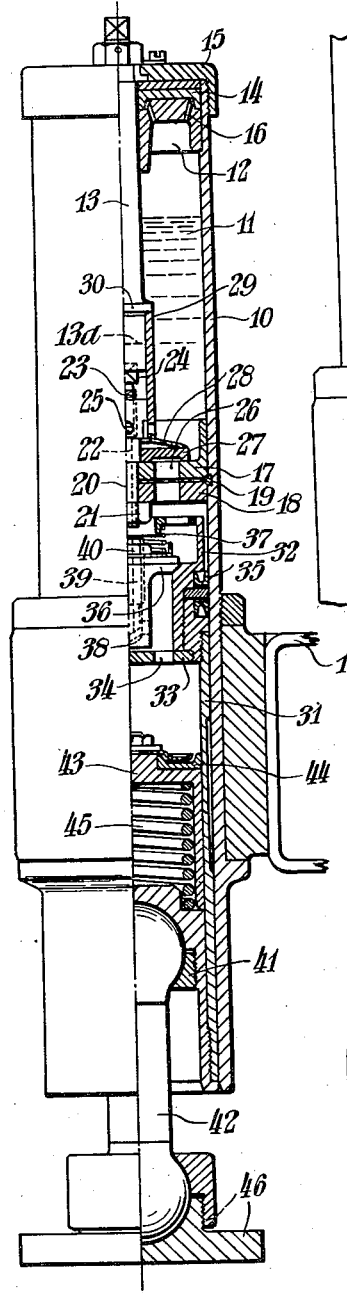
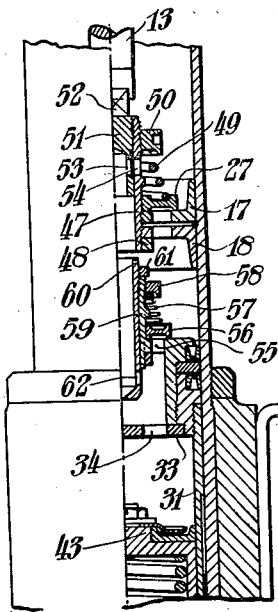
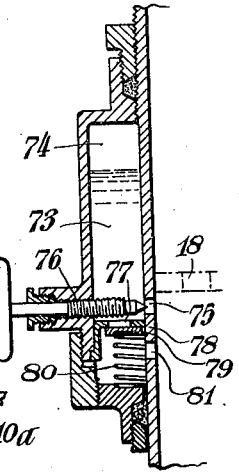
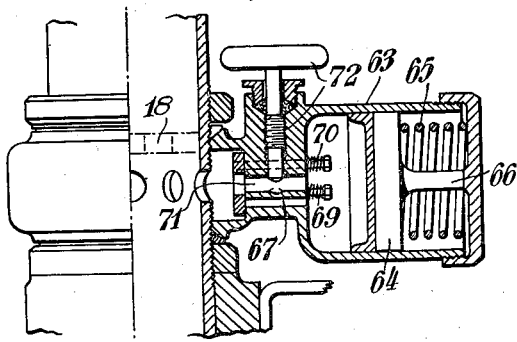
INVENTOR:
Noel B. Newton.
By his Attorney. Walter Gunn Patented Sept. 9, 1941

2,255,181

UNITED STATES PATENT OFFICE 2,255,181

SUSPENSION SYSTEM FOR VEHICLES

Noel Banner Newton, Acton, London, England

Application September 30, 1940, Serial No. 359,040
In Great Britain February 20, 1939

14 Claims. (Cl. 267—64)

This invention relates to suspension systems for vehicles of the kind wherein a spring or a pneumatic or other cushion supports the load through the medium of a fluid in a shock absorber acting on the principle of restricted fluid displacement.

In such a suspension system, the axle may be able to move in one direction, in advance of the return displacement of the fluid by the cushion, by creating a partial vacuum as by expansion of the vapour of the fluid or of air or gas contained therein, so that such movement would be followed by hydraulic knock when the parts return to their normal relative positions as predetermined by the volume of fluid between them.

This invention is based on an appreciation that freedom of relative movement for the axle or delay return action of the cushion will be advantageous and the object of the invention is to provide therefor whilst at the same time preventing hydraulic knock or any such effect.

According to the first feature of the invention a spring suspension system for vehicles of the kind wherein a spring, pneumatic or other cushion supports the load through the medium of a non-compressible fluid in a shock absorber acting on the principle of restricted fluid displacement is characterised by means permitting delay action of return displacement by the cushion relative to the return movement of the displacing member whilst keeping the effective displacement volume of the shock absorber full of the fluid.

According to the second feature of the invention, a system of the kind referred to is characterised by means providing controlled lost motion effect between the displacement member and the cushion by controlled permitted change of volume of the non-compressible fluid between the displacement member and the cushion.

According to the third feature of the invention, a system of the kind referred to is characterised by means for carrying over the stored energy in the cushion by permitting delay action of return displacement by the cushion and simultaneous momentary relative movement between the displacement member and the cushion with maintained full fluid connection between them ready for communication of the next shock to the cushion during such delay action return.

In the accompanying drawing:

Fig. 1 is a longitudinal part section of one example of a combined pneumatic suspension and shock absorber device made in accordance with the invention.

Fig. 2 is a longitudinal part section of a part of the device showing a modified arrangement of valves.

Fig. 3 shows a further modified arrangement of the device with an external auxiliary reservoir.

Fig. 4 shows another modified arrangement of the device with an external auxiliary reservoir.

In the example of the invention illustrated in Fig. 1 of the drawing, the device comprises a cylinder 10 at the upper end of which is a space 11 containing air under pressure to form a pneumatic cushion. A mounting bracket 10a is fixed to the cylinder 10. At the upper end is provided a guide block 12 for a rod 13, the purpose of which will be described later, a double flanged self-sealing gland packing 14 and an end cover 15, the block 12 having through holes 16 for the fluid pressure to reach the inner face of the flanges of the gland packing to give the self-sealing action.

The space 11 is separated from the main portion of the cylinder by a partition consisting of two parts 17 and 18 and located by a ring 19 positioned in a groove in the cylinder. The parts 17 and 18 are secured together by a central bolt 20 and nut 21, the bolt having a large diameter central through passage 22 forming a fluid return passage, in the upper end of which is an adjustable screw plug 23 with screw-driver shaped blade-like end 24. In the bolt 20 are lateral openings 25 adapted to be adjustably closed by the plug 23. In the parts 17 and 18 are through holes 26 which are in register and which are adapted to be closed by a disc check valve 27 normally held closed by a spring 28 abutting against a sleeve 29 carried on the rod 13 and engaging a shoulder 30 thereon. The blade 24 of the plug 23 engages a slot 13a in the inner end of the rod 13.

The piston of the shock absorber is constructed to embody the auxiliary reservoir and comprises a tubular body 31 having at its upper end a head 32 incorporating a changeable control disc 33 with through holes 34 limiting the maximum flow. Detachably mounted in the head are gland packings 35 and a mushroom valve 36 with return spring 37. The stem of the valve is formed hollow with a side outlet 38 and is fitted with an adjustable plug 39 with a central through passage which collectively provide an adjustable fluid return. The plug 39 is secured by a lock nut 40. In the lower end of the body 31 is fixed a two-part socket 41 for a ball ended connecting link 42, whilst in the hollow body of the piston is an auxiliary piston 43 with a packing 44 and backed by spring 45 within it and abutting against the socket 41. The other end of the link 42 is located in a socket in a two-part mounting bracket 46.

In operation, the shock absorber will be arranged upright and not horizontal. Under normal load conditions resilient suspension between the brackets 10a and 46 is provided by the air cushion in the space 11. Movement of the piston 31 is controlled under normal load and shock loads by flow of the fluid through the holes 26 and back through the controlled opening 25, during which time the internal pressures within the piston 31 are sufficient to keep the auxiliary piston 43 at the bottom of its cylinder and the spring 45 fully compressed. Under such normal conditions it must be understood that the piston 31 will be partly withdrawn from the substantially "fully in" position in which it is shown in Fig. 1. The air pressure within the space 11 is normally sufficient to return the fluid through the restricted openings 25 fast enough to follow up the piston and prevent the formation, or substantially prevent the formation, of a vacuum between the top of the piston and the partition.

If the device is applied to a vehicle, in the event however of the wheel being required to follow a pot hole any tendency for the formation of a vacuum owing to the rapid downward movement of the piston to permit the wheel to follow the curvature of the pot hole, will be prevented by the relatively free entrance of fluid which can occur past the valve 36 from the auxiliary reservoir within the piston end with the assistance of the spring 45 acting on the piston 43. Thus, the construction permits change of volume of the non-compressible fluid between the displacement member or piston 31 and the air cushion in the space 11, which is controlled by the valve 36 and which provides a lost motion effect whereby the air pressure in the cushion is not positively related to the relative position of the piston in its cylinder at all times. Air below the piston 43 expands to permit such movement of the fluid. The piston 43 is returned to its normal position as shown by the return flow of fluid through the controlled outlets 38 in the valve 36. When the wheel of the vehicle engages the other side of the pot hole there will be no vacuum "knock" within the shock absorber as the space above the piston will be full and the increase of pressure of the air cushion within the space 11 in the upper part of the cylinder is available as pressure on top of the piston, subject of course, to permitted return flow of the extra fluid to the auxiliary reservoir. When the piston in the auxiliary reservoir has again returned to its end position abutting against the end of its cylinder, the normal conditions will be re-established so that the pressure in the upper part of the cylinder is directly proportional to the position of the piston of the cylinder. Obviously during the abnormal condition above explained the pressure in the air cushion which is transmitted to the piston will be greater than would normally obtain for any position of the piston when the piston is commencing to rise again.

Fig. 2 shows a modified construction of the valve mechanism for the partition and piston. Where the parts are the same as in Fig. 1 they are given the same reference numerals.

As shown, the two parts 17 and 18 of the partition are secured together by a tube 47 and nut 48, whilst the disc valve 27 is returned by a spring 49 having an abutment ring 50 adjustably mounted on a tube 47. Within the tube is a screwed plug 51 having a screw-driver head 52 similar to that of the plug 23, the lower end of such plug being hollow and having side openings 53. In the tube are side openings 54 adapted to be adjustably closed by the plug 51. Instead of the valve 36 the piston head is formed with through passages 55 normally closed by a ring 56 under the action of a spring 57 with adjustable abutment ring 58 carried by a tube 59. Within the tube 59 is an adjustable tube 60 closed at its lower end and secured by a nut 61 and having apertures 62 adapted to be wholly or partly exposed below the lower end of the tube 59. The rest of the shock absorber parts may be constructed as shown in Fig. 1 or according to usual shock absorber practice.

As shown in Fig. 3, connected to the side of the cylinder is an auxiliary reservoir 63 containing a piston 64 and a lively spring 65 behind it, the piston having a stop 66, to engage the end of the cylinder so as to provide a definite limit to its movement and avoid breakage of the spring. This auxiliary cylinder is connected with the space immediately below the partition 18, shown in chain line, in the cylinder, by passages 67, one only of which is shown, having a control disc valve 68 mounted on pins 69 with return springs 70, and by one central communicating passage 71 with adjustable valve screw 72, so that fluid can flow relatively freely through the passages 67 from the auxiliary reservoir into the cylinder whilst its return through the passage 71 is relatively restricted. The spring 65 behind the piston in the auxiliary reservoir is of large static deflection, and a lively nature, so as to keep a pressure of relatively small gradient within the reservoir, but lower in pressure than the normal pressure which will obtain in the main cylinder. The communication between the auxiliary reservoir and the main cylinder may be such that the flow passage to the cylinder is at a lower level than the return passage, and is covered by the piston in the main cylinder when at the upper end of its stroke. The construction shown in Fig. 3 is shown arranged immediately above the mounting bracket 10a of Fig. 1. The complete shock absorber may comprise the usual compressible fluid in the space above the partition 18 forming the cushion, flow restricting means in the partition for the non-compressible hydraulic fluid and a displacement piston below the partition or it may comprise the construction of parts as shown in Fig. 1.

As shown in Fig. 4 an auxiliary chamber 73 is mounted on the outside of the cylinder so as to provide an air pressure space 74, a restricted inflow through a hole 75 controlled by a valve 76 and a free flow to the cylinder through holes 77 in a partition 78 controlled by a disc valve 79 with spring 80 and through holes 81 in the wall of the cylinder below the partition 18 therein, shown in chain line. With such an arrangement the main piston could be plain. The other parts of the shock absorber, not shown, may be constructed as described with reference to Fig. 2.

The operation of the device with modifications of the invention described in Figs. 2, 3 and 4 will obviously be the same in principle as described for the example of Fig. 1.

The invention is obviously not limited to the examples above described as obviously more than one auxiliary reservoir may be provided with different loading therein, so that intermediate conditions between normal and abnormal may result in operation of one or more of such auxiliary reservoirs, resulting in modification of the action of the shock absorber under intermediate conditions.

Also, the invention may be applied to double-acting or two-way shock absorbers so as to obtain the effect in either or both directions of movement with the result that a temporary increase of pressure within the cushions will occur to stiffen up the suspension system in both directions.

Again, it may be desirable to apply the invention to the elastic fluid medium of the air cushion by arranging for temporary displacement of part of the air cushion into an auxiliary chamber, or displacement from an auxiliary chamber to vary the amount of air momentarily available as the effective cushion so as thus to modify the action of the shock absorber.

It is also obvious that the invention is applicable where part of the load is supported by spring or cushion means not operating through the medium of the non-compressible fluid in the shock absorber but in such case the delay action or lost motion provided by the present invention will only be effective as regards that portion of the supporting spring or cushion which does operate through the fluid medium.

What I claim is:

1. A spring suspension system for vehicles comprising in combination a cushion member and a fluid type shock absorber arranged for the cushion member to support a load through the medium of a non-compressible fluid in the shock absorber, the shock absorber having relatively movable parts providing displacement of the fluid towards and away from the cushion and a flow restricting valve providing increased restriction to flow away from the cushion and an auxiliary reservoir with cushion member therein connected to the shock absorber for flow of fluid by pressure difference between the shock absorber and the auxiliary reservoir, adjustable flow control means between them and stop means positively limiting the yield of the cushion member in the auxiliary reservoir.

2. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto.

3. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, the auxiliary fluid chamber being embodied in the piston.

4. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, the auxiliary fluid chamber being external of the cylinder.

5. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, a piston within the auxiliary fluid chamber, cushion means behind the piston and a positive stop for the piston limiting the reception volume of the auxiliary fluid chamber.

6. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, a piston within the auxiliary fluid chamber, cushion means behind the piston and a positive stop for the piston limiting the reception volume to the auxiliary fluid chamber, the cushion member behind the piston in the auxiliary fluid chamber being of relatively low power so that the piston is normally located against its stop by reason of the fluid pressure within the shock absorber.

7. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, a piston within the auxiliary fluid chamber, cushion means behind the piston, a positive stop for the piston limiting the reception volume of the auxiliary fluid chamber and adjustable flow control means between the auxiliary chamber and the cylinder, the cushion member behind the piston in the auxiliary fluid chamber being of relatively low power so that the piston is normally located against its stop by reason of the fluid pressure within the shock absorber.

8. A resilient suspension system for vehicles comprising a cylinder, a piston slidably mounted in the cylinder, a partition in the cylinder dividing off a cushion space, a non-compressible fluid in the effective displacement volume between the piston and the partition, passages permitting relatively free flow of fluid into the cushion space and relatively restricted flow therefrom and a closed auxiliary fluid chamber connected to the effective displacement volume through passages permitting relatively free flow of fluid from the auxiliary chamber and relatively restricted return flow thereto, a piston within the auxiliary fluid chamber, cushion means behind the piston, a positive stop for the piston limiting the reception volume of the auxiliary fluid chamber and externally adjustable flow control means between the auxiliary chamber and the cylinder, the cushion member behind the piston in the auxiliary fluid chamber being of relatively low power so that the piston is normally located against its stop by reason of the fluid pressure within the shock absorber.

9. A resilient suspension system for vehicle according to claim 5, characterized in that the positive stop is an element additional to the cushion means in the auxiliary fluid chamber.

10. A resilient suspension system for vehicles comprising a shock absorber having a fluid displacing member, a receiving space for displaced fluid with an intervening controlling flow passage, the volume of which space is independent of the movement of the displacing member and a cushion member acting on the displaced fluid, in combination with means operating by pressure difference for momentarily supplementing the volume of fluid between the displacement member and the cushion member by admitting supplementary fluid between the displacement member and the said controlling flow passage so as to permit advance return movement of the displacement member relative to displaced fluid return by the cushion member.

11. A resilient suspension system for vehicles comprising a shock absorber having a fluid displacing member, a receiving space for displaced fluid with an intervening controlling flow passage, the volume of which space is independent of the movement of the displacing member and a cushion member acting on the displaced fluid, in combination with means operating by pressure difference for momentarily supplementing the volume of fluid between the displacement member and the cushion member by admitting supplementary fluid between the displacement member and the said controlling flow passage so as to permit advance return movement of the displacement member relative to displaced fluid return by the cushion member and means controlling the admission of the supplementary fluid.

12. A resilient suspension system for vehicles comprising a shock absorber having a fluid displacing member, a receiving space for displaced fluid with an intervening controlling flow passage, the volume of which space is independent of the movement of the displacing member and a cushion member acting on the displaced fluid, in combination with means operating by pressure difference for momentarily supplementing the volume of fluid between the displacement member and the cushion member by admitting supplementary fluid between the displacement member and the said controlling flow passage so as to permit advance return movement of the displacement member relative to displaced fluid return by the cushion member, said means comprising an auxiliary fluid reservoir with a cushion member therein to provide the pressure difference.

13. A resilient suspension system for vehicles comprising a shock absorber having a fluid displacing member, a receiving space for displaced fluid with an intervening controlling flow passage, the volume of which space is independent of the movement of the displacing member and a cushion member acting on the displaced fluid, in combination with means operating by pressure difference for momentarily supplementing the volume of fluid between the displacement member and the cushion member by admitting supplementary fluid between the displacement member and the said controlling flow passage so as to permit advance return movement of the displacement member relative to displaced fluid return by the cushion member, said means comprising an auxiliary fluid reservoir with a cushion member therein to provide the pressure difference and means controlling the flow of fluid to and from the auxiliary fluid reservoir arranged to provide relatively free flow from the same.

14. A resilient suspension system for vehicles comprising a shock absorber having a fluid displacing member, a receiving space for displaced fluid with an intervening controlling flow passage, the volume of which space is independent of the movement of the displacing member and a cushion member acting on the displaced fluid, in combination with means operating by pressure difference for momentarily supplementing the volume of fluid between the displacement member and the cushion member by admitting supplementary fluid between the displacement member and the said controlling flow passage so as to permit advance return movement of the displacement member relative to displaced fluid return by the cushion member, said means comprising an auxiliary fluid reservoir with a cushion member therein to provide the pressure difference and adjustable means controlling the flow of fluid to and from the auxiliary fluid reservoir arranged to provide relatively free flow from the same.

NOEL BANNER NEWTON.